(12) United States Patent
Moon

(10) Patent No.: US 11,909,985 B2
(45) Date of Patent: Feb. 20, 2024

(54) ELECTRONIC DEVICE AND METHOD OF OPERATING THE SAME

(71) Applicant: SAMSUNG ELECTRONICS CO., LTD., Suwon-si (KR)

(72) Inventor: Sungho Moon, Suwon-si (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 17/706,033

(22) Filed: Mar. 28, 2022

(65) Prior Publication Data

US 2023/0035779 A1  Feb. 2, 2023

(30) Foreign Application Priority Data

Jul. 29, 2021 (KR) ........................ 10-2021-0100139

(51) Int. Cl.
*H04N 19/159* (2014.01)
*H04N 19/162* (2014.01)
*H04N 19/426* (2014.01)
*H04N 19/172* (2014.01)

(52) U.S. Cl.
CPC ......... *H04N 19/159* (2014.11); *H04N 19/162* (2014.11); *H04N 19/172* (2014.11); *H04N 19/426* (2014.11)

(58) Field of Classification Search
CPC .. H04N 19/159; H04N 19/162; H04N 19/172; H04N 19/426; H04N 19/132; H04N 19/16; H04N 19/40; H04N 21/2343; H04N 5/915; H04N 5/9261; H04N 21/4402; H04N 21/8455; H04N 21/8549
See application file for complete search history.

(56) References Cited

U.S. PATENT DOCUMENTS

| | | | |
|---|---|---|---|
| 6,668,377 B1 | 12/2003 | Dunn | |
| 8,027,562 B2 | 9/2011 | Okada et al. | |
| 9,414,108 B2 | 8/2016 | Sirpal et al. | |
| 10,417,742 B2 | 9/2019 | Wang | |
| 10,957,278 B2 | 3/2021 | Kurita et al. | |
| 2016/0314819 A1* | 10/2016 | Elsner | .................... H04N 19/46 |
| 2020/0037020 A1* | 1/2020 | Raikar | ............. H04N 21/42204 |

FOREIGN PATENT DOCUMENTS

| | | |
|---|---|---|
| JP | 2008-227719 A | 9/2008 |
| KR | 10-2002-0078345 | 10/2002 |
| KR | 10-0474429 | 3/2005 |
| KR | 10-2008-0046918 | 5/2006 |

* cited by examiner

*Primary Examiner* — Nam D Pham
(74) *Attorney, Agent, or Firm* — Fish & Richardson P.C.

(57) ABSTRACT

An electronic device and a method of operating the same, the electronic device including a first decoder that decodes frames configuring a multimedia file stored in an external storage device; an encoder that encodes decoded frames included in a first decoded file; memory; and a controller that reads the multimedia file from the external storage device, extracts the frames from the read multimedia file, controls the first decoder and the encoder, and controls the memory to store the video thumbnail file output from the encoder.

18 Claims, 11 Drawing Sheets

ELECTRONIC DEVICE AND METHOD OF OPERATING THE SAME

CROSS-REFERENCE TO RELATED APPLICATION

A claim of priority under 35 U. S. C. § 119 is made to Korean Patent Application No. 10-2021-0100139, filed on Jul. 29, 2021, in the Korean Intellectual Property Office, the entirety of which is hereby incorporated by reference.

BACKGROUND

The present disclosure relates to an electronic device, and more particularly to an electronic device and a method of operating the same.

A recording medium storing a multimedia file stores video data to which an encoding compression algorithm such as the moving picture experts group (MPEG) format is applied. A sink device playing such a recording medium reads encoded data from the recording medium, decodes the read data from the encoded data into original data, and plays multimedia.

The sink device provides a forward/reverse screen search function so that a user may easily search for a desired scene. In the forward/reverse screen search function, preset scenes are sequentially displayed on a screen in a selection direction to correspond to a forward or reverse input selected by the user. The displayed screen is a still image, and the still image corresponds to one scene in an entire video section.

SUMMARY

Embodiments of the inventive concepts relate to an electronic device storing video thumbnail files for viewing before or previous to viewing a multimedia file stored in an external storage device and a method of operating the same.

Embodiments of the inventive concepts provide an electronic device connected to an external storage device storing a multimedia file, the electronic device including a first decoder that decodes frames configuring a multimedia file and outputs a first decoded file; an encoder that encodes decoded frames included in a first decoded file and outputs a video thumbnail file including the encoded frames; a memory that stores data; and a controller that reads the multimedia file from the external storage device, extracts the frames from the read multimedia file, controls the first decoder and the encoder to respectively output the first decoded file and the video thumbnail file, and controls the memory to store the video thumbnail file.

Embodiments of the inventive concept further provide an electronic device connected to an external storage device storing a plurality of multimedia files, the electronic device including a memory that stores a plurality of video thumbnail files respectively corresponding to the plurality of multimedia files; a first decoder that decodes all frames configuring a single one video thumbnail file from among the plurality of video thumbnail files and outputs a first decoded file; a second decoder that decodes sample frames sampled from the plurality of video thumbnail files and outputs a second decoded file; a user input module that outputs a selection signal; a controller that reads the plurality of video thumbnail files from the memory, controls the first decoder to generate the first decoded file based on a selected video thumbnail file selected from the plurality of video thumbnail files based on the selection signal, controls the second decoder to output the second decoded file, and processes the first decoded file and the second decoded file; and a display device that displays still thumbnail images and a video thumbnail image based on the first and second decoded files processed by the controller.

Embodiments of the inventive concept still further provide a method of operating an electronic device connected to an external storage device storing a multimedia file, the electronic device comprising a controller, a decoder and an encoder, the method including reading, by the controller, the multimedia file from the external storage device; decoding, by the decoder, sample frames among a plurality of frames configuring the read multimedia file; encoding, by the encoder, the decoded sample frames to provide encoded sample frames; and storing, by the controller, a video thumbnail file including the encoded sample frames in memory included in the electronic device.

Embodiments of the inventive concepts also provide an electronic device connected to an external storage device storing a plurality of multimedia files, the electronic device including a memory that stores a plurality of video thumbnail files respectively corresponding to the plurality of multimedia files; a first decoder; an encoder; and a controller that reads a multimedia file from among the plurality of multimedia files in the external storage device, extracts n frames from the read multimedia file, samples m frames from among the extracted n frames to provide sampled frames, controls the first decoder to decode the sampled frames to provide first decoded data, controls the encoder to encode the first decoded data to provide encoded data, and stores the encoded data in the memory as a video thumbnail file corresponding to the read multimedia file, wherein n and m are natural numbers and m is less than n.

BRIEF DESCRIPTION OF THE DRAWINGS

Embodiments of the inventive concepts will be more clearly understood from the following detailed description taken in conjunction with the accompanying drawings in which.

DETAILED DESCRIPTION

Figure 1:
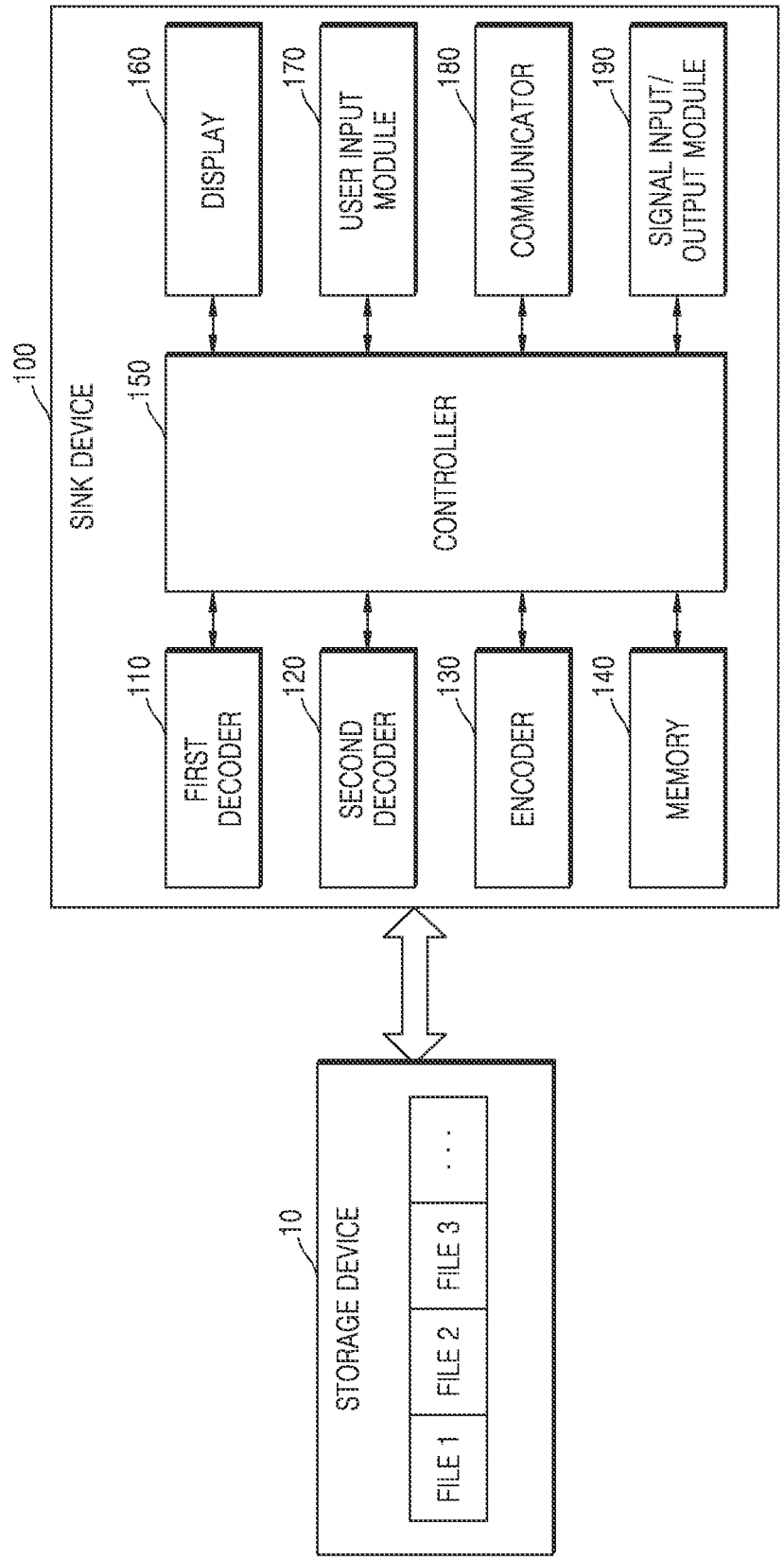
FIG. 1 illustrates an external storage device and a sink device according to embodiments of the inventive concepts.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts. Also, like reference numerals refer to like elements throughout in the accompanying drawings, and dimensions of structures may be exaggerated or reduced in order to clarify the inventive concepts.

FIG. 1 illustrates an external storage device 10 and a sink device 100 according to embodiments of the inventive concept.

Referring to FIG. 1, the external storage device 10 may store data. The external storage device 10 may receive a command and an address from a controller 150 included in the sink device 100, and may access a memory cell selected by the address from memory cells within the external storage device 10. The external storage device 10 may perform an operation instructed by the command on the memory cell selected by the address.

The command may be, for example, a read command, and the operation instructed by the read command may be, for example, a read operation. However, the inventive concepts are not limited thereto and other operations may be instructed. In the read operation, the external storage device 10 may read read data stored in the external storage device 10 in response to control of the controller 150.

The external storage device 10 may include, for example, a storage device based on flash memory. The flash memory may include, for example, NAND flash memory or NOR flash memory. The storage device based on flash memory may include, for example, a solid state drive (SSD) or a flash drive based on a universal serial bus (USB) configuration. The external storage device 10 may be implemented by a removable drive. The external storage device 10 may be implemented by a recording medium such as a video compact disc (CD) or a digital versatile disc (DVD).

In an embodiment, the external storage device 10 may store at least one multimedia file. Referring to FIG. 1, for example, the external storage device 10 may store first to third multimedia files FILE 1, FILE 2, and FILE 3. However, the inventive concepts are not limited thereto. The multimedia file may include image data and audio data. The multimedia file may be compressed in one of various formats such as the moving picture experts group (MPEG) format and the digital video express (DivX®) format. In an embodiment, the multimedia file may include a plurality of frames.

The sink device 100 may be an electronic device processing and playing a content signal (or a bit stream). The content signal may include video data and audio data provided by an external device (for example, a source device). Alternatively, the sink device 100 may be an electronic device processing and playing a multimedia file selected by a user from the first to third multimedia files FILE 1, FILE 2, and FILE 3 stored in the external storage device 10. Here, the term "playing" may mean displaying an image in accordance with processed video data, outputting audio in accordance with the processed audio data, or representing an image and audio in accordance with the processed video data and audio data. The sink device 100 may be implemented for example in one of various forms such as a TV, a monitor, a portable multimedia player (PMP), a mobile phone, a tablet, an electronic picture frame, an electronic blackboard, and an electronic billboard or the like.

The external storage device 10 may be connected to the sink device 100. Specifically, a port included in the external storage device 10 may be connected to a port included in the sink device 100.

In an embodiment, the sink device 100 may include a first decoder 110, a second decoder 120, an encoder 130, memory 140, the controller 150, a display device 160, a user input module 170, a communicator 180, and a signal input and output module 190.

The first decoder 110 may decode frames (or a bit stream) provided by the controller 150 and may output a first decoded file. In an embodiment, the frames (or the bit stream) may be extracted from the first to third multimedia files FILE 1, FILE 2, and FILE 3 stored in the external storage device 10. Alternatively, in another embodiment, the frames (or the bit stream) may be extracted from a content signal received from the outside (for example, a source device, a server, or a broadcast station). However, the inventive concepts are not limited thereto.

In an embodiment, the first decoder 110 may decode the frames and may output the first decoded file during a period at least partially overlapping a period in which the display device 160 performs a display operation. That is, the first decoder 110 may decode the frames as a background operation.

In an embodiment, the first decoder 110 may decode at least two specific frames among all the frames included in each of the first to third multimedia files FILE 1, FILE 2, and FILE 3. The specific frames may be sample frames sampled, for example, every I frame or at preset time intervals. However, the inventive concepts are not limited thereto.

The second decoder 120 may decode the frames (or the bit stream) provided by the controller 150 and may output a second decoded file.

In an embodiment, the second decoder 120 may decode all the frames included in the multimedia file selected by the user from the first to third multimedia files FILE 1, FILE 2, and FILE 3 stored in the external storage device 10. That is, in order for the display device 160 to play a multimedia file that the user desires to receive, the second decoder 120 may decode the selected multimedia file.

In an embodiment, the second decoder 120 may decode the bit stream of the content signal received from the outside (for example, the source device, the server, or the broadcast station).

In an embodiment, in order to play content selected by the user, the second decoder 120 as a main decoder may decode a bit stream corresponding to the content selected by the user and may output second decoded data, and the first decoder 110 as a sub-decoder may decode a bit stream corresponding to additional content and may output first decoded data. In accordance with the first decoder 110 as the sub-decoder, the display device 160 may support a multi-view function or a multi-instance function.

In some embodiments such as described with respect to FIG. 1, the sink device 100 includes the first decoder 110 and the second decoder 120. However, the inventive concepts are not limited thereto, and the sink device 100 may include three or more decoders. In this case, at least one of the three or more decoders may operate as a main decoder and the remaining decoders may operate as sub-decoders.

The encoder 130 may encode a file (or a frame included in the file) and data.

In an embodiment, the encoder 130 may receive the first decoded file output from the first decoder 110, may encode decoded frames included in the first decoded file, and may output a video thumbnail file including the encoded frames. That is, the encoder 130 may encode decoded frames of the first decoded file and output them as encoded frames. An encoding method may include, for example, encoding using the MPEG format. However, the inventive concepts are not limited thereto. The video thumbnail file may include at least two encoded frames.

The memory 140 may read stored data (i.e., data stored therein) and may output the read data in response to control of the controller 150. Alternatively, the memory 140 may store data in response to control of the controller 150. The memory 140 may be implemented by, for example, non-volatile memory that stores and maintains data regardless of power supply.

In an embodiment, the memory 140 may store the video thumbnail file output from the encoder 130. For example, if the external storage device 10 stores the first to third multimedia files FILE 1, FILE 2, and FILE 3, the memory 140 may store first to third video thumbnail files respectively corresponding to the first to third multimedia files FILE 1, FILE 2, and FILE 3.

The controller 150 may control an overall operation of the sink device 100. The controller 150 may for example be implemented by a processor such as a central processing unit (CPU) or the like, and may further include memory such as a buffer or a register.

The controller 150 may communicate with the external device or the external storage device 10 in accordance with a specific communication standard. For example, the controller 150 may communicate with the external device or the external storage device 10 through at least one of various communication standards such as USB, Multi-Media Card™ (MMC), embedded memory such as eMIMC®, peripheral component interconnection (PCI), PCI-express (PCI-E), advanced technology attachment (ATA), serial-ATA, parallel-ATA, small computer system interface (SCSI), enhanced small disk interface (ESDI), integrated drive electronics (IDE), firewire, universal flash storage (UFS), WIFI, Bluetooth, and NVMe.

In an embodiment, the controller 150 may read the first to third multimedia files FILE 1, FILE 2, and FILE 3 from the external storage device 10. Then, the controller 150 may extract frames from the first to third multimedia files FILE 1, FILE 2, and FILE 3. At this time, the controller 150 may extract all the frames included in the first to third multimedia files FILE 1, FILE 2, and FILE 3, or may extract preset specific frames. Then, the controller 150 may control the first decoder 110 to output the first decoded file. Then, the controller 150 may control the encoder 130 to output the video thumbnail file. Then, the controller 150 may control the memory 140 to store the video thumbnail file.

In another embodiment, the controller 150 may read the first to third video thumbnail files from the memory 140, and may control the first decoder 110 to generate the first decoded file based on a video thumbnail file selected from the first to third video thumbnail files. The selected video thumbnail file corresponds to a still thumbnail image selected by the user, as described below with reference to FIGS. 5A to 5C. On the other hand, the controller 150 may control the second decoder 120 to output the second decoded file for the first to third video thumbnail files. Then, the controller 150 may process the first and second decoded files and may transmit the processed first and second decoded files to the display device 160.

The display device 160 may display an image based on a bit stream, a decoded frame, or a decoded file processed by the controller 150.

In an embodiment, the display device 160 may display at least one still thumbnail image based on the second decoded file. When the first to third video thumbnail files are stored in the memory 140, the display device 160 may display first to third thumbnail images respectively corresponding to the first to third video thumbnail files. On the other hand, when the user selects one of the first to third displayed thumbnail images, a video thumbnail file corresponding to the selected thumbnail image is decoded by the first decoder 110 and the display device 160 may display the selected thumbnail image as a video thumbnail image based on the first decoded file processed by the controller 150. The video thumbnail image may represent a set of partial scenes of a corresponding video in chronological order.

The user input module (circuit) 170 may be provided so as to be manipulatable by the user. The user input module 170 may include various kinds of input interface-related circuits. For example, the user input module 170 may be implemented in one of various forms such as a mechanical or electronic button of the sink device 100, a remote controller, a touchpad, and a touch screen separate from a main body of the sink device 100.

In an embodiment, the user input module 170 may receive a selection signal representing information selected by the user and may transmit the selection signal to the controller 150. For example, when the display device 160 displays first to third still thumbnail images, the user may select one of the first to third still thumbnail images by using the user input module 170. A selection signal corresponding to the selected still thumbnail image may be transmitted to the controller 150.

The communicator 180 may be a bidirectional communication circuit including at least one of components such as communication modules and communication chips corresponding to various kinds of wired and wireless communication protocols. The communicator 180 may be implemented in one of various forms such as a Wi-Fi communication chip performing Wi-Fi communication through an access point, a Bluetooth low energy (BLE) communication chip performing BLE communication, and a LAN card connected to a router or a gateway.

The signal input and output module (circuit) 190 may function as a communication interface. For example, the signal input and output module 190 may transmit the content signal processed by the controller 150 of the sink device 100. In an embodiment, the signal input and output module 190 may include a transmitter and a receiver. In the current embodiment, the signal input and output module 190 may transmit and receive a signal based on the high-definition multimedia interface (HDMI™) transmission standard. The HDMI transmission standard is released until version 2.1.

The sink device 100 may further include an audio device outputting audio.

Figure 2:
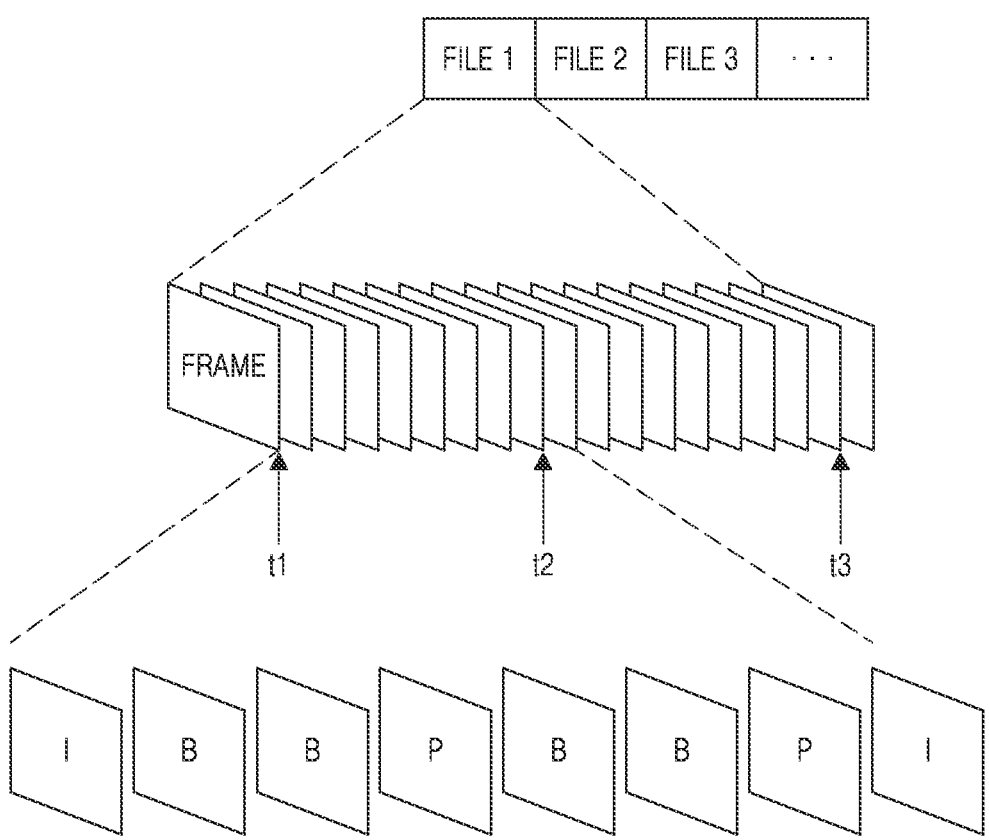
FIG. 2 illustrates a multimedia file according to embodiments of the inventive concepts.

FIG. 2 illustrates a multimedia file according to embodiments of the inventive concepts.

Referring to FIGS. 1 and 2, each of the first to third multimedia files FILE 1, FILE 2, and FILE 3 may include a plurality of frames. For example, the first multimedia file FILE 1 may include a plurality of frames FRAME. The controller 150 may extract the plurality of frames included in the multimedia file. Taking an example with reference to FIGS. 1 and 2, the controller 150 may extract all the frames FRAME configuring the first multimedia file FILE 1. However, the inventive concept is not limited thereto.

Each frame FRAME at points in time t1, t2, and t3 may be displayed. In an embodiment, the controller 150 may sample frames from the plurality of frames FRAME at preset time intervals. Taking an example with reference to FIGS. 1 and 2, the controller 150 may sample a frame FRAME at each of the first to third points in time t1 to t3. In another embodiment, the controller 150 may provide the plurality of extracted frames FRAME to the first decoder 110, and the first decoder 110 may sample frames from the plurality of frames FRAME at preset time intervals. In another embodiment, the second decoder 120 may sample frames from the plurality of frames FRAME at preset time intervals. In the current specification, the number of time intervals is not limited to that of FIG. 2 and may vary.

In an embodiment, the controller 150 may sample frames FRAME included in preset time intervals of the plurality of frames FRAME. Taking an example with reference to FIGS. 1 and 2, the controller 150 may sample frames FRAME included in a period from the first point in time t1 to the second point in time t2 (or a period from the second point in time t2 to the third point in time t3). In another embodiment, the first decoder 110 may sample frames FRAME included in preset time intervals of the plurality of frames FRAME. In another embodiment, the second decoder 120 may sample frames FRAME included in preset time intervals of the plurality of frames FRAME.

The plurality of frames FRAME may include intra (I) frames I, predicted (P) frames P, and bidirectional (B) frames B. The frames FRAME may be arranged so that a front part of an entire section is in the order of the intra frame I, the bidirectional frame B, the bidirectional frame B, the predicted frame P, the bidirectional frame B, the bidirectional frame B, and the predicted frame P. However, the inventive concepts are not limited thereto. A structure in which the bidirectional frame B and the predicted frame P are arranged between the intra frames I may vary and only the intra frame I and the predicted frame P may be arranged without the bidirectional frame B.

The intra frame I may be arranged in any position of the bit stream. The intra frame I is used for arbitrary access of data and may be encoded without referring to the other frames. In the MPEG format, compressibility of the intra frame I may be lower than compressibilities of the other frames. The intra frame I may be referred to as a key frame.

The predicted frame P may be stored by predicting only data on a portion in which a difference occurs based on the immediately previous intra frame I. The predicted frame P may be referred to as a forward prediction frame.

The bidirectional frame B may be between the intra frame I and the predicted frame P and may be stored by predicting only data on movement between the intra frame I and the predicted frame P with reference to the intra frame I and the predicted frame P. The bidirectional frame B may be referred to as a bidirectional prediction frame.

Figure 3A:
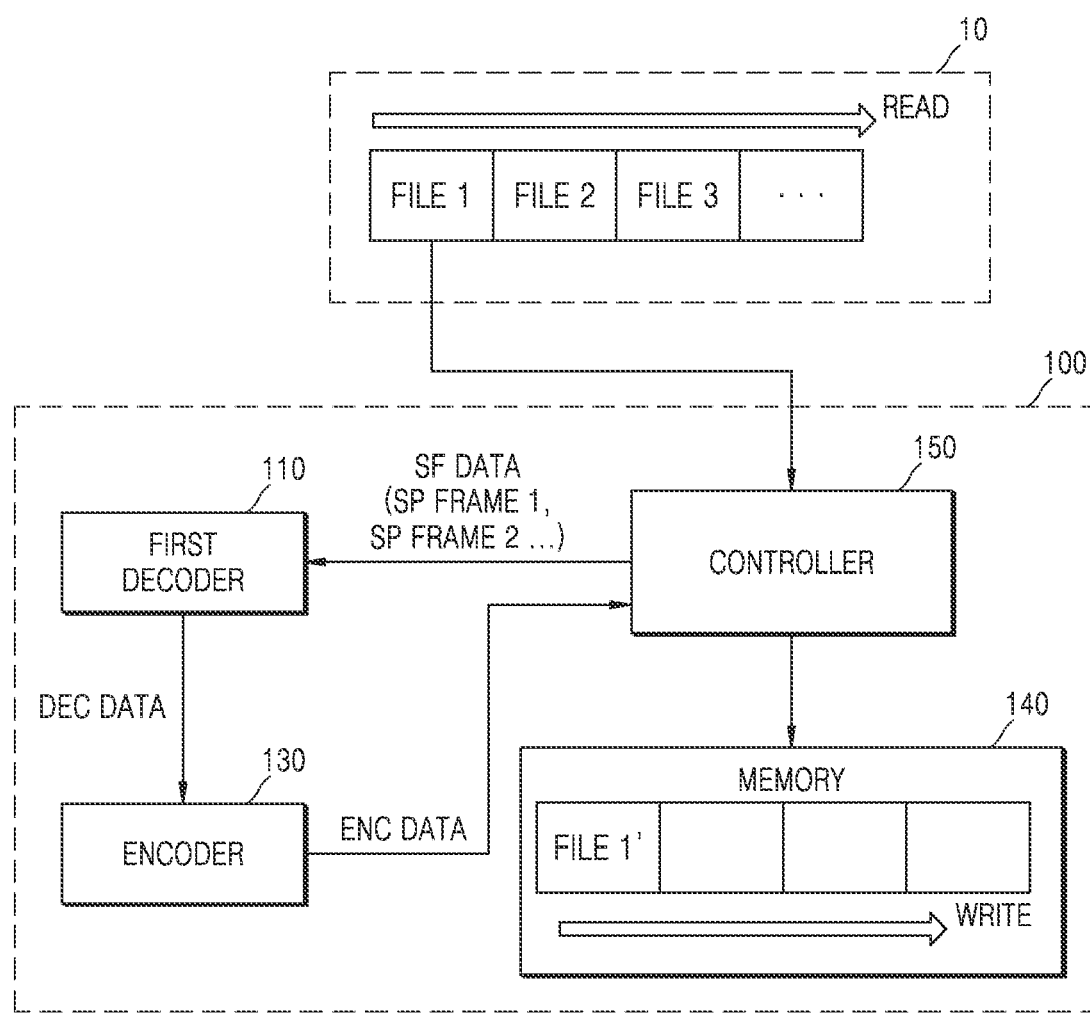
FIGS. 3A and 3B illustrate embodiments of the inventive concepts in which a video thumbnail file is stored.
Figure 3B:
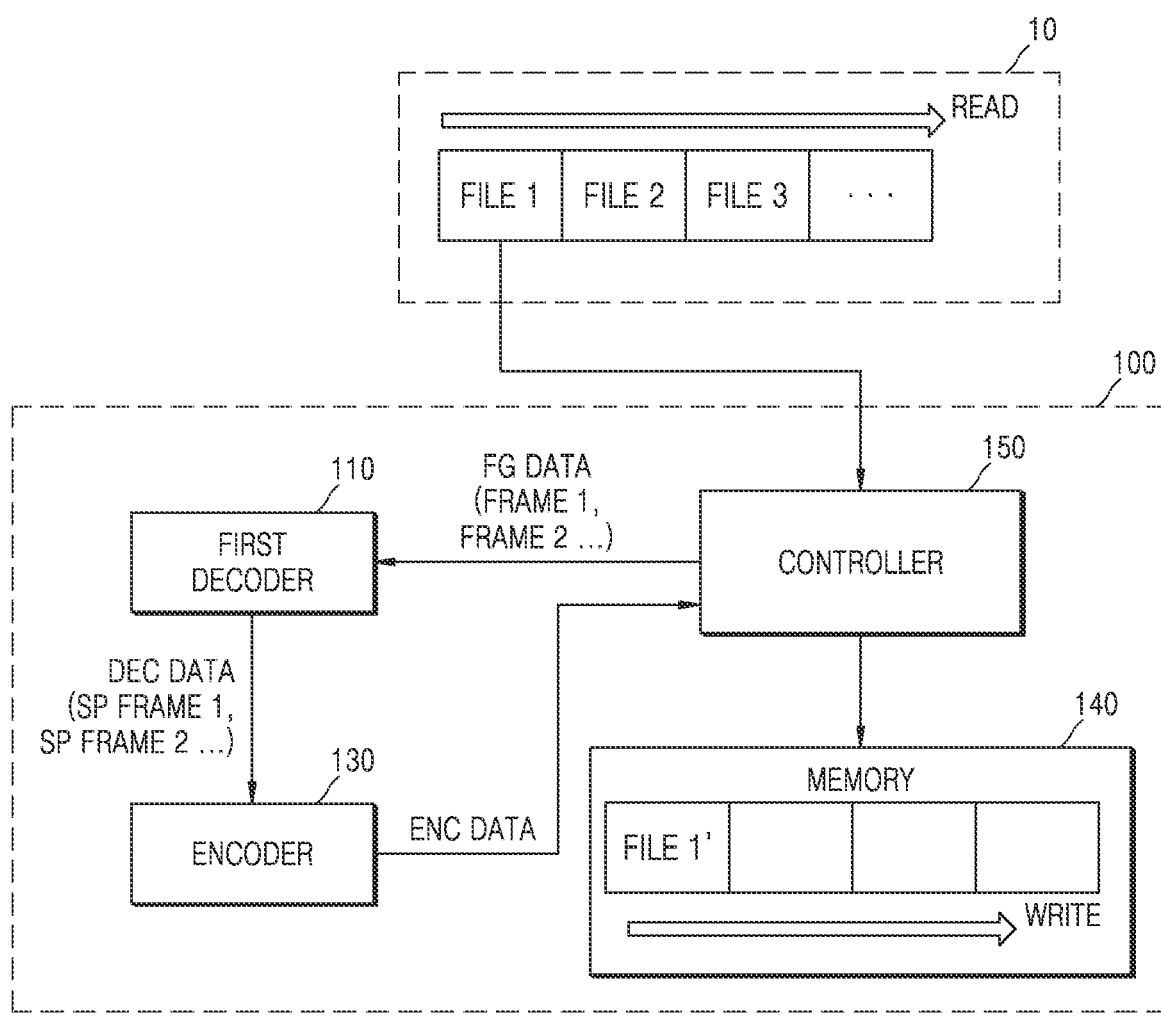

FIGS. 3A and 3B illustrate embodiments in which a video thumbnail file is stored.

Referring to FIG. 3A, the controller 150 may read a multimedia file stored in the external storage device 10. Specifically, the controller 150 may sequentially read the first to third multimedia files FILE 1, FILE 2, and FILE 3 stored in the external storage device 10. The read first to third multimedia files FILE 1, FILE 2, and FILE 3 may be sequentially loaded on the controller 150. Taking an example with reference to FIG. 3A, the controller 150 may read the first multimedia file FILE 1 from the first to third multimedia files FILE 1, FILE 2, and FILE 3 and the read first multimedia file FILE 1 may be loaded on the controller 150.

The controller 150 may extract a plurality of frames FRAME included in the read multimedia file, may sample frames from the plurality of frames FRAME at preset time intervals, and may provide sample frame data SF DATA including first and second sample frames SP FRAME 1 and SP FRAME 2 to the first decoder 110. The first and second sample frames SP FRAME 1 and SP FRAME 2 may include, for example, the I frames I, the P frames P, or the B frames B. Taking an example with reference to FIGS. 2 and 3A, the controller 150 may extract a plurality of frames FRAME from the first multimedia file FILE 1, may sample a frame FRAME from the plurality of frames FRAME at each of the first to third points in time t1 to t3, and may provide the sample frame data SF DATA to the first decoder 110. Taking another example with reference to FIGS. 2 and 3A, the first multimedia file FILE 1 may include a plurality of I frames I. In this case, the controller 150 may extract the plurality of I frames I from the first multimedia file FILE 1, may sample (or extract) at least two I frames I from the plurality of I frames I, and may provide the sample frame data SF DATA to the first decoder 110. Taking another example with reference to FIGS. 2 and 3A, the first multimedia file FILE 1 may include n I frames I. In this case, the controller 150 may sample m I frames I from the n I frames I extracted from the first multimedia file FILE 1 and may provide the sample frame data SF DATA to the first decoder 110. In this example, n may be a natural number of no less than 3 and m may be a natural number less than n and greater than 1. Therefore, the video thumbnail file may be generated faster and content of a corresponding multimedia file may be more easily grasped by decoding minimum required I frames I in order to generate the video thumbnail file from the plurality of I frames I.

The controller 150 may control the first decoder 110 to decode the sample frame data SF DATA. The first decoder 110 may decode the first and second sample frames SP FRAME 1 and SP FRAME 2 included in the sample frame data SF DATA. Then, the first decoder 110 may output decoded data DEC DATA including the decoded first and second sample frames SP FRAME 1 and SP FRAME 2. Here, the decoded data DEC DATA may be the above-described first decoded file. The decoded data DEC DATA may be provided to the encoder 130 through a data bus (not shown). Alternatively, the decoded data DEC DATA may be provided to the controller 150 through the data bus and then, may be provided to the encoder 130.

A size of the decoded data DEC DATA is less than that of a multimedia file. However, the size of the decoded data DEC DATA may be too great to be stored in the memory 140 as the video thumbnail file. Therefore, an encoding operation for reducing the size of the decoded data DEC DATA is required. The controller 150 may control the encoder 130 to encode the decoded data DEC DATA. The encoder 130 may encode the decoded data DEC DATA and may output encoded data ENC DATA including encoded frames. The encoded data ENC DATA may be provided to the controller 150 through the data bus and then, may be provided to the memory 140.

In an embodiment, a size of an encoded frame may be less than that of a decoded frame. For example, the encoded frame may have a standard definition (SD) class size.

The controller 150 may extract the encoded frames and may control the memory 140 to store the video thumbnail file including the encoded frames. For example, the controller 150 may control the memory 140 to store a first video thumbnail file FILE 1' including encoded frames in a specific storage space of the memory 140 for the first multimedia file FILE 1.

In an embodiment, a size of each frame included in the video thumbnail file may be less than that of each frame included in the multimedia file. For example, a size of each of the frames included in the first video thumbnail file FILE 1' may be less than that of each of the frames included in the first multimedia file FILE 1.

In an embodiment, a size of the video thumbnail file stored in the memory 140 may be less than that of the multimedia file stored in the external storage device 10. For example, the size of the first video thumbnail file FILE 1' may be less than that of the first multimedia file FILE 1.

For the second and third multimedia files FILE 2 and FILE 3, as described above, the second and third video thumbnail files may be sequentially written in the memory 140.

On the other hand, the storage capacity of the memory 140 is limited. When the storage capacity assigned to store the video thumbnail file in the memory 140 is full, the controller 150 according to an embodiment may control the external storage device 10 to store the video thumbnail file in the external storage device 10. Therefore, the video thumbnail file may be written in the external storage device 10.

In the embodiment illustrated in FIG. 3A, the controller 150 provides some of the plurality of frames included in the multimedia file to the first decoder 110. On the other hand, the controller 150 may provide the plurality of frames included in the multimedia file to the first decoder 110 and the first decoder 110 may selectively decode some of the plurality of frames.

Referring to FIG. 3B, the controller 150 may sequentially read the first to third multimedia files FILE 1, FILE 2, and FILE 3 stored in the external storage device 10.

The controller 150 may extract the plurality of frames FRAME included in the read multimedia files and may provide frame group data FG DATA including all frames FRAME 1 and FRAME 2 included in one multimedia file to the first decoder 110. Taking an example with reference to FIGS. 2 and 3B, the controller 150 may extract all the frames FRAME from the first multimedia file FILE 1 and may provide the frame group data FG DATA to the first decoder 110.

The controller 150 may control the first decoder 110 to decode the frame group data FG DATA. The first decoder 110 may sample the first and second sample frames SP FRAME 1 and SP FRAME 2 from all the frames FRAME 1 and FRAME 2 included in the frame group data FG DATA at preset time intervals and may decode the first and second sample frames SP FRAME 1 and SP FRAME 2. Alternatively, the first decoder 110 may decode at least two I frames I among all the frames FRAME 1 and FRAME 2 included in the frame group data FG DATA. Then, the first decoder 110 may output the decoded data DEC DATA. The decoded data DEC DATA may be provided to the encoder 130 through the data bus or may be provided to the encoder 130 after being provided to the controller 150.

The controller 150 may control the encoder 130. The encoder 130 may encode the decoded data DEC DATA and may output the encoded data ENC DATA. The controller 150 may extract encoded frames and may control the memory 140 to store a video thumbnail file (for example, the first video thumbnail file FILE 1') including the encoded frames. For the second and third multimedia files FILE 2 and FILE 3, the second and third video thumbnail files may be sequentially generated and may be stored in the memory 140. In this case, a size of each frame included in the video thumbnail file may be less than that of each frame included in the multimedia file.

As described above, by storing the video thumbnail files for viewing before or previous to viewing the multimedia file stored in the external storage device 10, better user experience UX may be provided to users.

In addition, as described above, by generating video thumbnail files having sizes less than a size of a multimedia file stored in the external storage device 10, the storage space of the memory 140 included in the sink device 100 may be efficiently used.

Figure 4A:
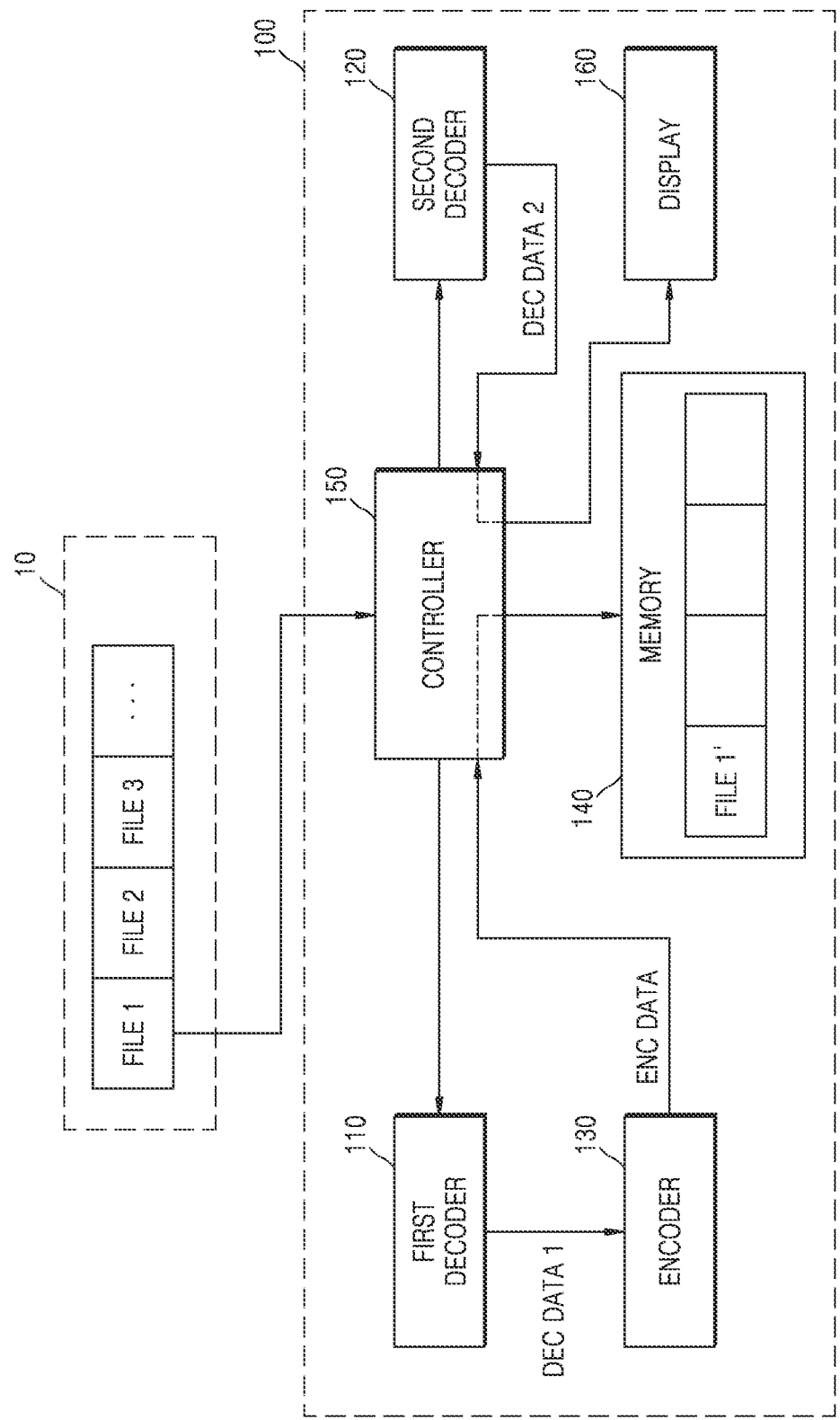
FIGS. 4A and 4B illustrate embodiments of the inventive concepts in which a video thumbnail file is stored during a display operation.
Figure 4B:
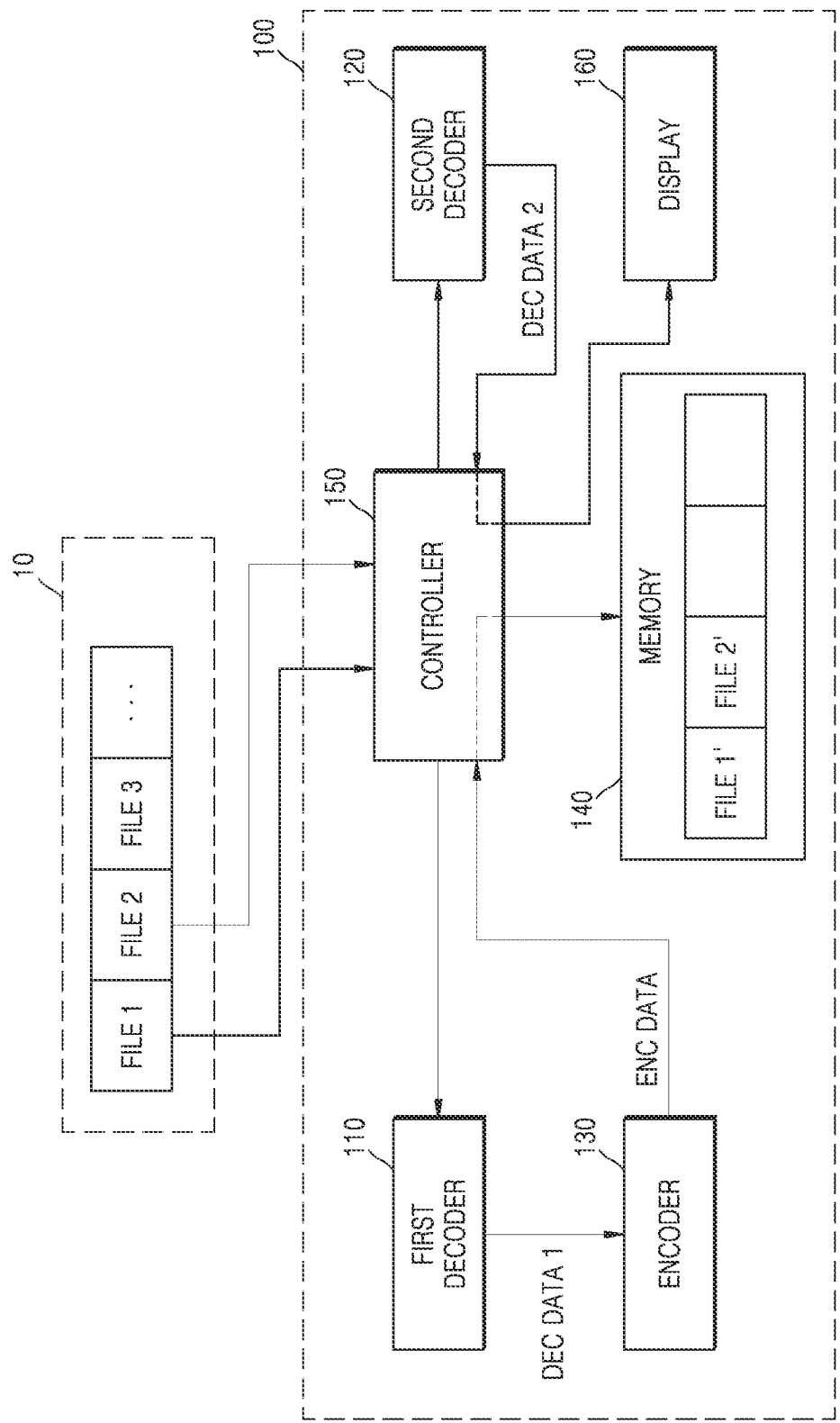

FIGS. 4A and 4B illustrate embodiments in which a video thumbnail file is stored during a display operation.

Referring to FIG. 4A, in an embodiment, by selecting one of the first to third multimedia files FILE 1, FILE 2, and FILE 3 by using the user input module 170 (see FIG. 1), a user may view selected multimedia through the display device 160. Specifically, when the user selects the first multimedia file FILE 1, the user input module 170 may output an input signal representing that the first multimedia file FILE 1 is selected and the controller 150 may read the first multimedia file FILE 1. Then, the controller 150 may extract all the frames from the first multimedia file FILE 1. Alternatively, the controller 150 may generate a bit stream based on the first multimedia file FILE 1. The controller 150 may control the second decoder 120 to decode the bit stream of the first multimedia file FILE 1. The second decoder 120 may decode the bit stream of the first multimedia file FILE 1 and may output second decoded data DEC DATA 2. Here, the second decoded data DEC DATA 2 may be the above-described second decoded file. The controller 150 may process the second decoded data DEC DATA 2, may provide the processed second decoded data DEC DATA 2 to the display device 160, and may control the display device 160. The display device 160 may perform a display operation based on the processed second decoded data DEC DATA 2. That is, the display device 160 may display multimedia of the first multimedia file FILE 1.

On the other hand, during a period at least partially overlapping a period in which the display device 160 displays the multimedia of the first multimedia file FILE 1, as described above with reference to FIG. 3A or 3B, the controller 150 may read the first multimedia file FILE 1 stored in the external storage device 10, may extract a plurality of frames FRAME from the first multimedia file FILE 1, and may control the first decoder 110 to output first decoded data DEC DATA 1 based on the plurality of frames FRAME. The controller 150 may control the encoder 130 to output the encoded data ENC DATA. The controller 150 may extract encoded frames from the encoded data ENC DATA and may control the memory 140 to store the first video thumbnail file FILE 1' corresponding to the first multimedia file FILE 1.

In another embodiment, the controller 150 may provide a bit stream received from the outside through the communicator 180 (see FIG. 1) or the signal input and output module 190 (see FIG. 1) to the second decoder 120. The second decoder 120 may decode the bit stream provided by the controller 150 and may output the second decoded data DEC DATA 2 to the controller 150. The controller 150 may process the second decoded data DEC DATA 2, may provide the processed second decoded data DEC DATA 2 to the display device 160, and may control the display device 160. The display device 160 may perform a display operation based on the processed second decoded data DEC DATA 2.

Referring to FIG. 4B, during a period at least partially overlapping a period in which the display device 160 displays the multimedia of the first multimedia file FILE 1, a second video thumbnail file FILE 2' may be generated for the second multimedia file FILE 2 stored in the external storage device 10 and may be stored in the memory 140. In addition, a third video thumbnail file FILE 3' may be generated for the third multimedia file FILE 3 stored in the external storage device 10 and may be stored in the memory 140. That is, an operation of storing the first, second, and third video thumbnail files (for example, FILE 1', FILE 2', and FILE 3' of FIG. 4B) corresponding to the first to third multimedia files FILE 1, FILE 2, and FILE 3 in the memory 140 may be performed as a background operation for the display operation of the display device 160.

As described above, by storing the video thumbnail files in the sink device 100 as the background operation for the display operation of the display device 160, better user experience UX may be provided to users.

Figure 5A:
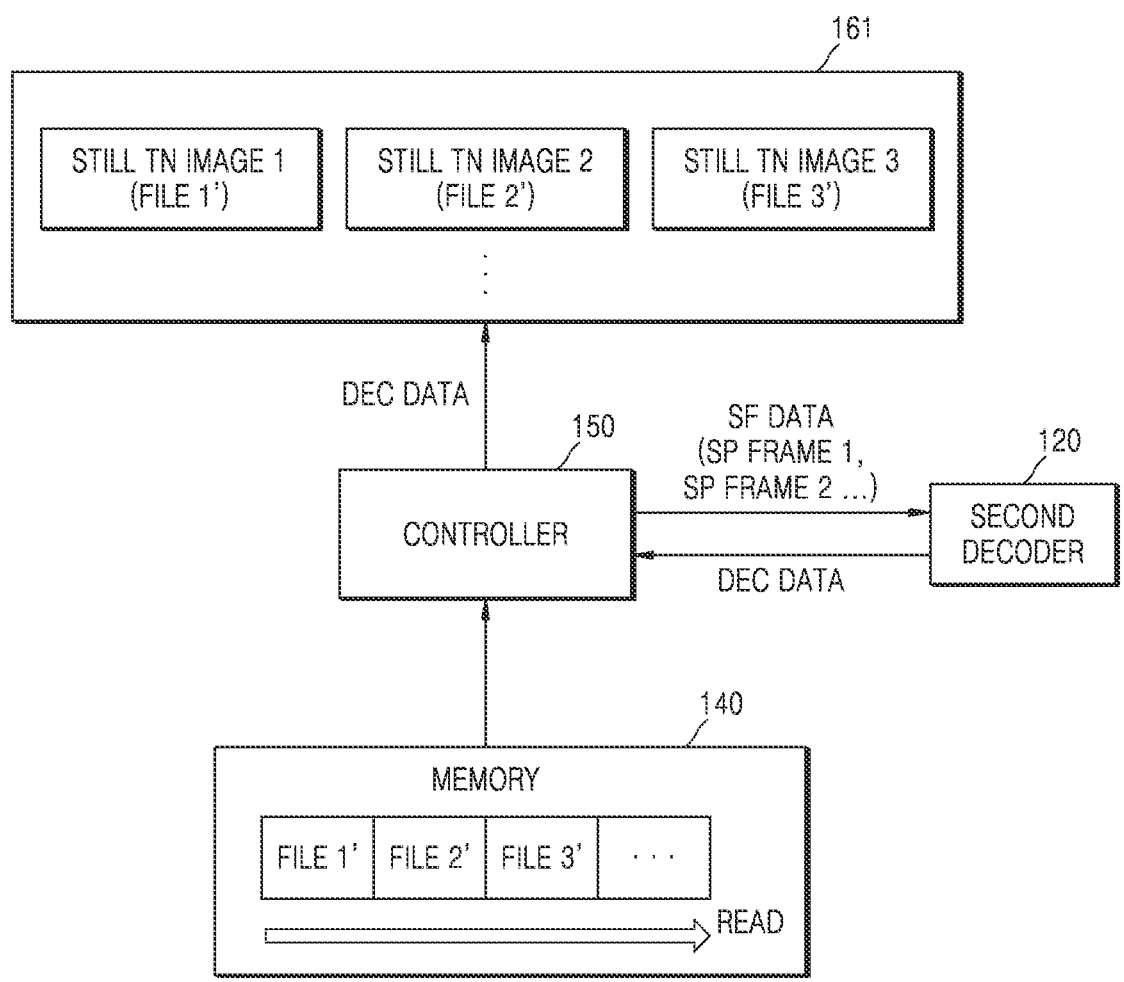
FIGS. 5A, 5B, and 5C illustrate embodiments of the inventive concepts in which still thumbnail images and video thumbnail images are displayed.
Figure 5B:
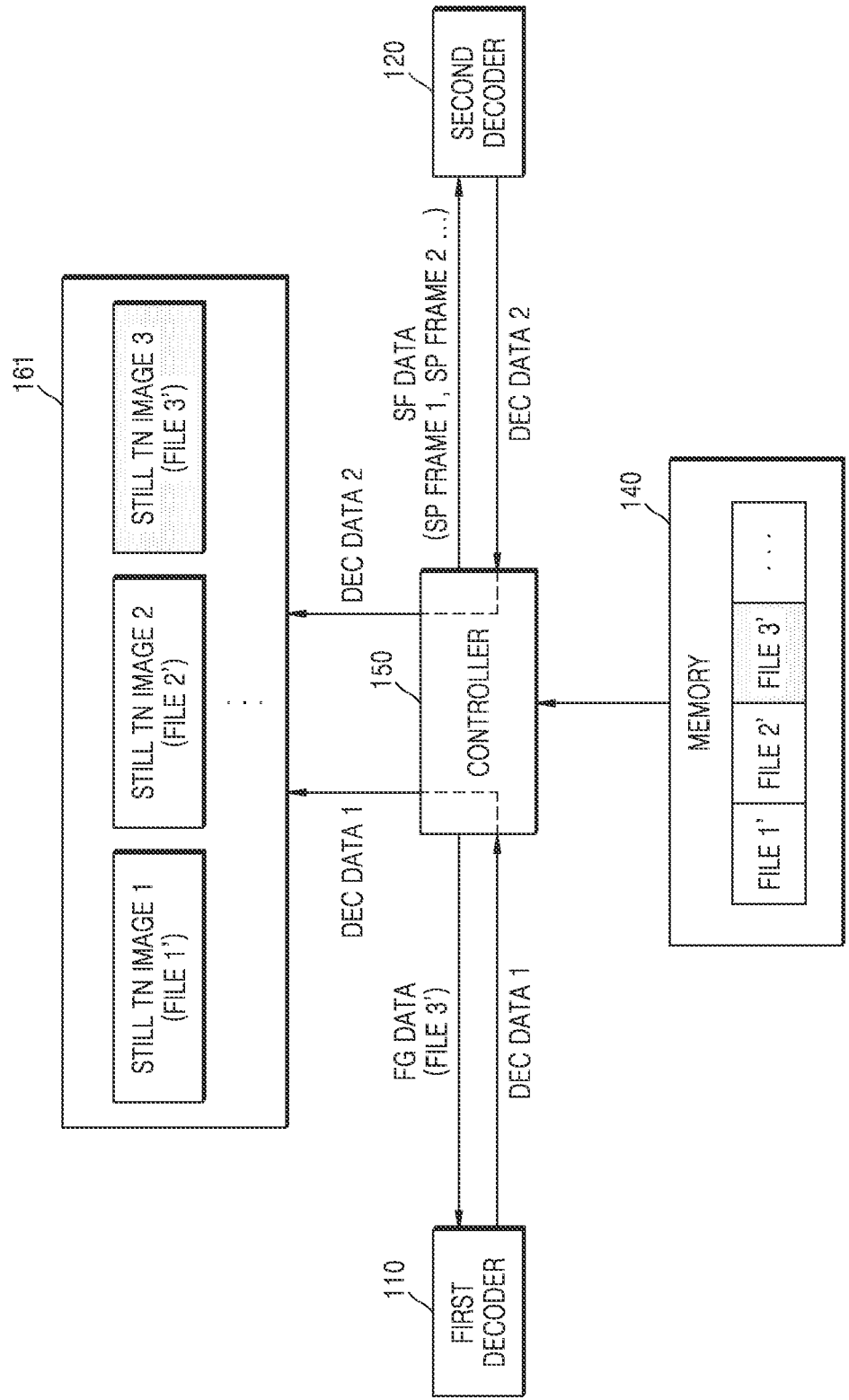
Figure 5C:
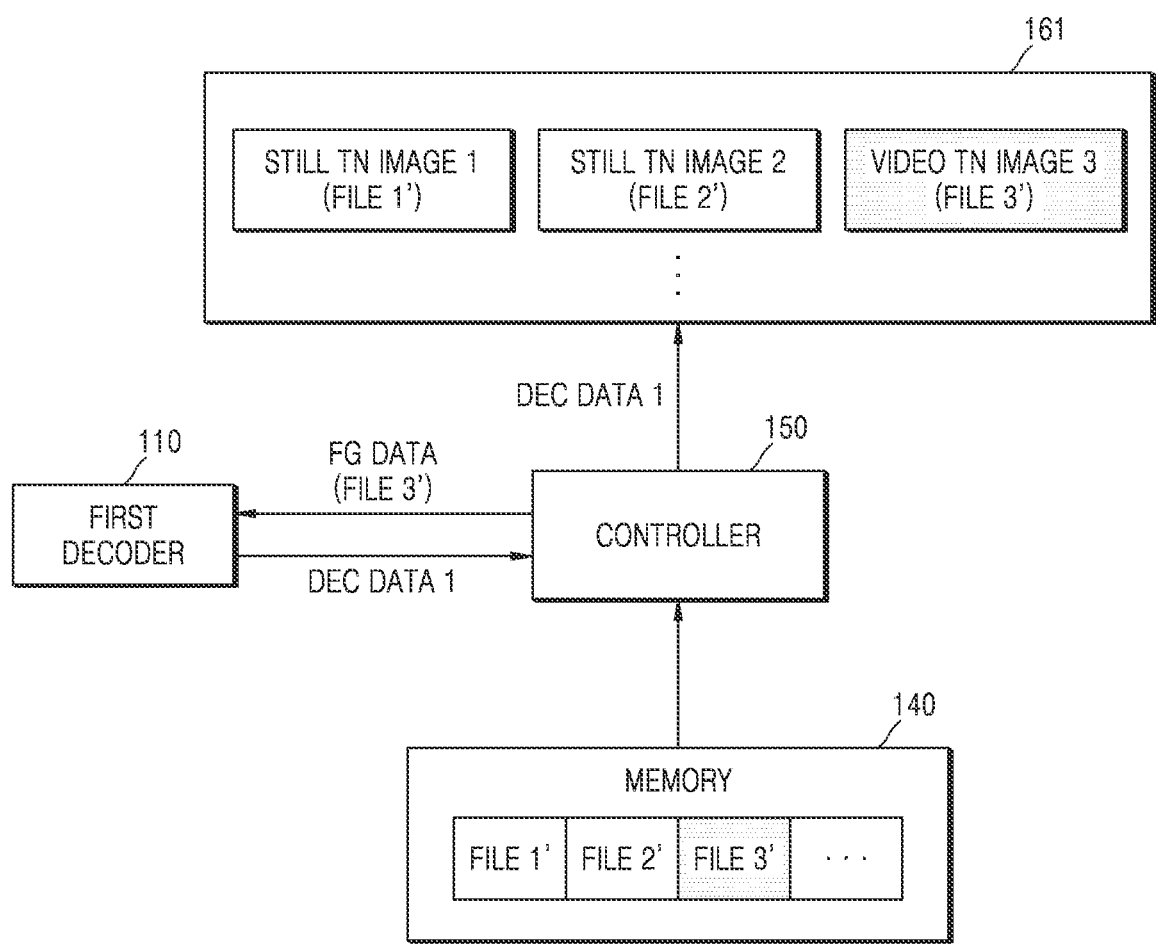

FIGS. 5A, 5B, and 5C illustrate embodiments in which still thumbnail images and video thumbnail images are displayed.

Referring to FIGS. 1, 4B, and 5A, the memory 140 may store first to third video thumbnail files FILE 1', FILE 2', and FILE 3'. Sizes of the first to third video thumbnail files FILE 1', FILE 2', and FILE 3' stored in the memory 140 may be less than those of the first to third multimedia files stored in the external storage device 10. Taking an example with reference to FIGS. 4B and 5A, the size of the first video thumbnail file FILE 1' may be less than that of the first multimedia file FILE 1. The size of the second video thumbnail file FILE 2' may be less than that of the second multimedia file FILE 2.

The display device 160 may play the multimedia of the multimedia file (for example, the first multimedia file FILE 1) selected by the user and may stand by. Alternatively, the display device 160 may stand by in response to an input of the user. In this case, the controller 150 may read the first to third video thumbnail files FILE 1', FILE 2', and FILE 3' stored in the memory 140. The read first to third video thumbnail files FILE 1', FILE 2', and FILE 3' may be loaded on the controller 150. For example, when the controller 150 reads the first video thumbnail file FILE 1', the first video thumbnail file FILE 1' may be loaded on the controller 150. However, the inventive concepts are not limited thereto.

In an embodiment, the controller 150 may extract all the frames included in the read video thumbnail file, may provide the frame data including the sample frames to the second decoder 120, and may control the second decoder 120. The second decoder 120 may decode a frame at a preset point in time, for example, a first intra frame I among all the frames. For example, the controller 150 may extract and output all the frames included in the read first video thumbnail file FILE 1'. The second decoder 120 may consider the first intra frame I of the first video thumbnail file FILE 1' as the first sample frame SP FRAME 1 and may decode the first intra frame I.

In another embodiment, the controller 150 may extract all the frames included in the read video thumbnail file so that a frame at a preset point in time among all the frames is considered as a specific sample frame (for example, the first intra frame I). Then, the controller 150 may provide the frame data including the extracted specific sample frame to the second decoder 120. In this case, the second decoder 120 may decode the specific sample frame.

Similarly, the second sample frame SP FRAME 2, for example, the first intra frame I of all the frames included in the second video thumbnail file FILE 2', may be decoded by the second decoder 120. In addition, a third sample frame, for example, the first intra frame I of all the frames included in the third video thumbnail file FILE 3', may be decoded by the second decoder 120. The second decoder 120 may decode sample frames sampled from the first to third video thumbnail files and may output a second decoded file. As described above, a specific frame (for example, the first intra frame I) in the same position is extracted from each of the first to third video thumbnail files FILE 1', FILE 2', and FILE 3' as a sample frame and, when the extracted sample frame is decoded, a frame group including the sample frame corresponding to each of the first to third video thumbnail files FILE 1', FILE 2', and FILE 3' is considered as one bit stream and decoded data DEC DATA corresponding to the one bit stream may be output. The controller 150 may process the decoded data DEC DATA.

The display device 160 may include a display panel 161. The display device 160 may display a still thumbnail image based on the processed decoded data DEC DATA. Specifically, the display device 160 may display the first to third still thumbnail images on the display panel 161. Taking an example with reference to FIG. 5A, the first still thumbnail image STILL TN IMAGE 1 may correspond to the first video thumbnail file FILE 1', the second still thumbnail image STILL TN IMAGE 2 may correspond to the second video thumbnail file FILE 2', and the third still thumbnail image STILL TN IMAGE 3 may correspond to the third video thumbnail file FILE 3'. In this case, the first to third still thumbnail images STILL TN IMAGE 1, STILL TN IMAGE 2, and STILL TN IMAGE 3 may be displayed on the display panel 161. However, the inventive concepts are not limited thereto.

Referring to FIGS. 1 and 5B, the user may select one of the first to third still thumbnail images STILL TN IMAGE 1, STILL TN IMAGE 2, and STILL TN IMAGE 3 displayed on the display panel 161 by using the user input module 170. For example, the user may select the third still thumbnail image STILL TN IMAGE 3 by using the user input module 170. The user input module 170 may output a selection signal representing the selected still thumbnail image, for example, the third still thumbnail image STILL TN IMAGE 3, to the controller 150. The selection signal may be received by the controller 150 after the decoded data DEC DATA (or the second decoded file) described above with reference to FIG. 5A is processed.

The controller 150 may read the third video thumbnail file FILE 3' from the memory 140 in response to the selection signal. The controller 150 may extract all the frames included in the third video thumbnail file FILE 3' and may provide the frame group data FG DATA including the frames of the third video thumbnail file FILE 3' to the first decoder 110. The controller 150 may control the first decoder 110 to generate the first decoded data DEC DATA 1 based on the video thumbnail file (for example, the third video thumbnail file FILE 3') selected by the selection signal.

The first decoder 110 may decode all the frames configuring the selected video thumbnail file. The first decoder 110 may decode the frame group data FG DATA and may output the first decoded data DEC DATA 1 to the controller 150. The controller 150 may process the first decoded data DEC DATA 1 and may provide the processed first decoded data DEC DATA 1 to the display device 160.

The second decoder 120 may decode the still thumbnail images (for example, the first and second still thumbnail images STILL TN IMAGE 1 and STILL TN IMAGE 2) for the unselected video thumbnail files (for example, the first and second video thumbnail files FILE 1' and FILE 2') among the first to third video thumbnail files FILE 1', FILE 2', and FILE 3' and may output the second decoded data DEC DATA 2 to the controller 150, and the controller 150 may provide the processed second decoded DEC DATA 2 to the display device 160.

Referring to FIG. 5C, the display device 160 may display the first and second still thumbnail images STILL TN IMAGE 1 and STILL TN IMAGE 2 on the display panel 161 based on the processed second decoded data DEC DATA 2. On the other hand, after the selection signal is received, the display device 160 may display the selected still thumbnail image (for example, the third still thumbnail image STILL TN IMAGE 3) as a video thumbnail image (for example, a third video thumbnail image VIDEO TN TMAGE 3) based on the processed first decoded data DEC DATA 1. Therefore, the first and second still thumbnail images STILL TN IMAGE 1 and STILL TN IMAGE 2 and the third video thumbnail image VIDEO TN TMAGE 3 may be displayed on the display panel 161. As described previously, the video thumbnail image may represent a set of partial scenes of corresponding video in chronological order.

As described above, by showing the user the video thumbnail images for the multimedia files stored in the external storage device 10, better user experience UX may be provided to users.

Figure 6:
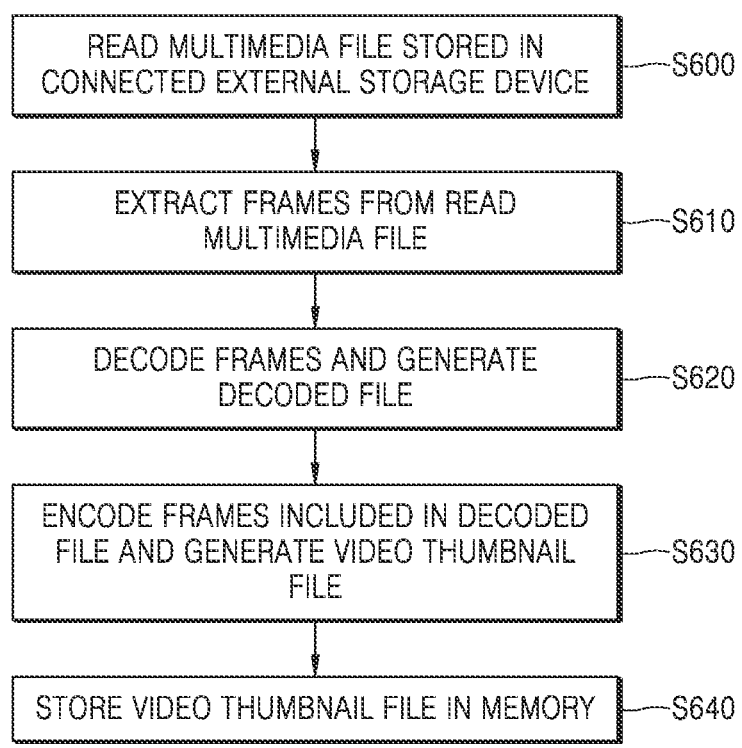
FIG. 6 illustrates a flowchart descriptive of a method of storing a video thumbnail file according to embodiments of the inventive concepts.

FIG. 6 illustrates a flowchart descriptive of a method of storing a video thumbnail file according to embodiments of the inventive concepts.

Referring to FIG. 6 and FIG. 1 for example, in operation S600, the sink device 100 reads a multimedia file stored in the external storage device 10. Operation S600 may be referred to as a read process.

In operation S610, the sink device 100 extracts frames from the read multimedia file. Specifically, the controller 150 extracts a plurality of frames configuring the read multimedia file. Operation S610 may be referred to as an extraction process.

In operation S620, the sink device 100 decodes the frames and generates a decoded file. Specifically, the first decoder 110 decodes sample frames (for example, at least two I frames I) among the extracted frames and generates the first decoded data DEC DATA 1. Operation S620 may be referred to as a decoding process.

In an embodiment, operation S620 (or the decoding process) includes sampling frames from a plurality of frames at preset time intervals and decoding the sampled frames as sample frames, which is described above with reference to FIGS. 2 and 3A.

In operation S630, the sink device 100 encodes frames included in a decoded file and generates a video thumbnail file. Specifically, the encoder 130 encodes decoded sample frames and outputs the encoded data ENC DATA, and the controller 150 processes the encoded data ENC DATA and generates a video thumbnail file (for example, the first video thumbnail file FILE 1'). Operation S630 may be referred to as an encoding process.

In an embodiment, operation S630 (or the encoding process) includes reducing sizes of decoded sample frames and generating a video thumbnail file including the sample frames of which sizes are reduced, which is described above with reference to FIGS. 2 and 3A.

In operation S640, the sink device 100 stores a video thumbnail file including encoded sample frames in the memory 140 included in the sink device 100. Specifically, the controller 150 controls the memory 140 to store the video thumbnail file (for example, the first video thumbnail file FILE 1'). Operation S640 may be referred to as a storage process.

In an embodiment, a display process is performed together with operations S600 to S640. That is, the display process is performed during a period at least partially overlapping a period during which operations S600 to S640 are performed. In the display process, display is performed based on a bit stream or a multimedia file provided from the outside.

Figure 7:
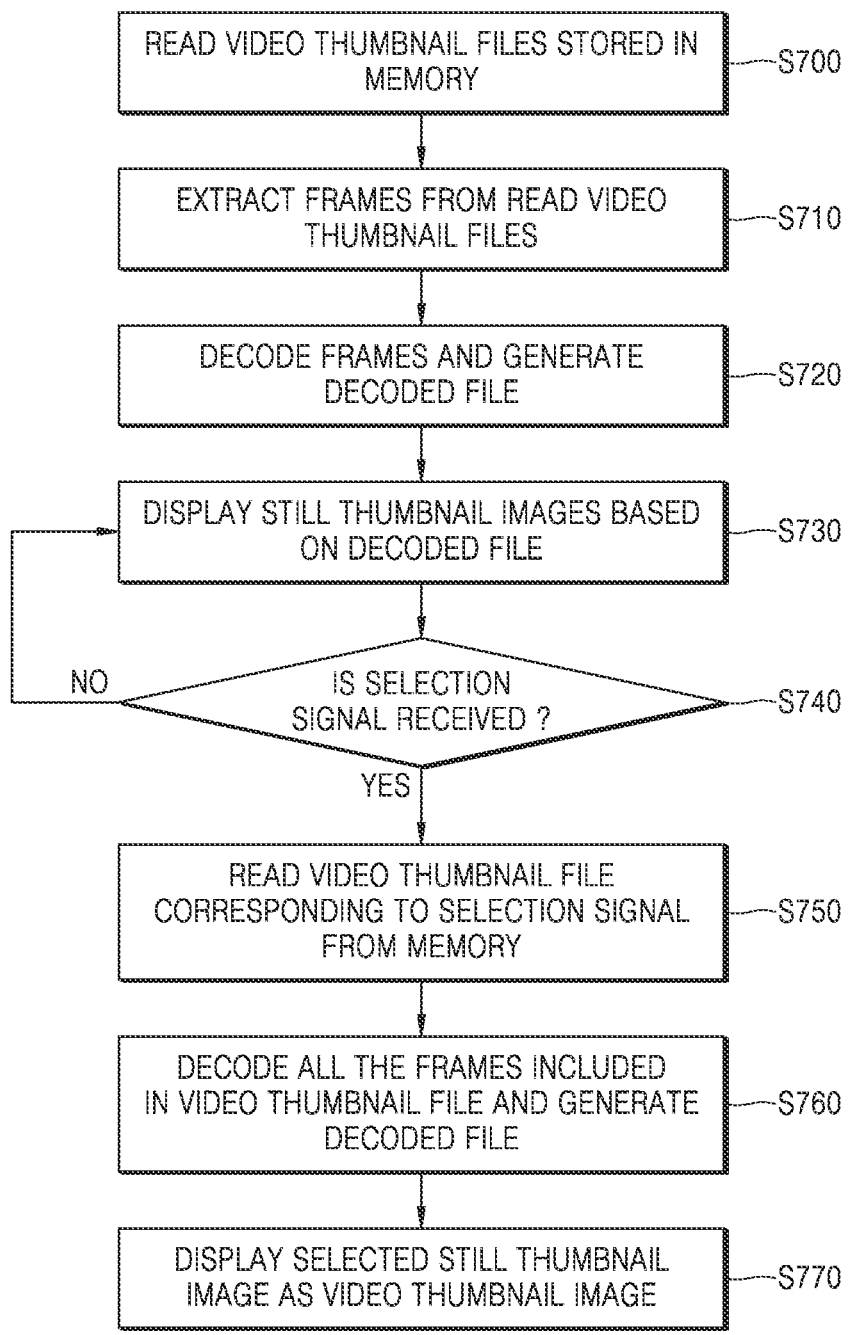
FIG. 7 illustrates a flowchart descriptive of a method of displaying a still thumbnail image and a video thumbnail image according to embodiments of the inventive concepts.

FIG. 7 illustrates a flowchart descriptive of a method of displaying a still thumbnail image and a video thumbnail image according to embodiments of the inventive concepts.

Referring to FIG. 7 and FIGS. 5A-5C for example, in an embodiment, the display method illustrated in FIG. 7 may include displaying a still thumbnail image based on a stored video thumbnail file, receiving a selection signal selecting a still thumbnail image from the outside, and displaying a still thumbnail image as a video thumbnail image based on a stored video thumbnail file in response to the selection signal after operation S640 (or the storage process) illustrated in FIG. 6.

Specifically, in operation S700, the sink device 100 connected to the external storage device 10 reads video thumbnail files stored in the memory 140 included in the sink device 100. Specifically, the controller 150 reads the first to third video thumbnail files FILE 1', FILE 2', and FILE 3' stored in the memory 140.

In operation S710, the sink device 100 extracts a frame from each of the read video thumbnail files. Specifically, for example, the controller 150 extracts the first intra frame I from the first video thumbnail file FILE 1', extracts the first intra frame I from the second video thumbnail file FILE 2', and extracts the first intra frame I from the third video thumbnail file FILE 3'. However, the inventive concepts are not limited thereto.

In operation S720, the sink device 100 decodes extracted frames and generates a decoding file, which is described above in operation S620 with reference to FIG. 6.

In operation S730, the sink device 100 displays still thumbnail images based on the decoded file. Specifically, for example, the display device 160 displays the first to third still thumbnail images STILL TN IMAGE 1, STILL TN IMAGE 2, and STILL TN IMAGE 3 on the display panel 161.

In operation S740, the sink device 100 determines whether the selection signal is received. Specifically, for example, when a user selects one of the first to third still thumbnail images STILL TN IMAGE 1, STILL TN IMAGE 2, and STILL TN IMAGE 3 displayed on the display panel 161 by using the user input module 170, the selection signal indicating the selected still thumbnail image is received by the controller 150.

When the selection signal is not received (NO in operation S740), operation S730 is performed.

When the selection signal is received (YES in operation S740), operation S750 is performed. In operation S750, the sink device 100 reads a video thumbnail file corresponding to the selection signal from the memory 140. In operation S760, the sink device 100 decodes all the frames included in the selected video thumbnail file and generates a decoded file. In operation S770, the sink device 100 displays the selected still thumbnail image as a video thumbnail image, which is described above with reference to FIGS. 5B and 5C.

While the inventive concepts have been particularly shown and described with reference to embodiments thereof, it should be understood that various changes in form and detail may be made therein without departing from the spirit and scope of the following claims. The inventive concepts should not be limited to specific disclosed embodiments, but should be understood as including all modifications, equivalents, and replacements within the scope of the inventive concepts.

What is claimed is:

1. An electronic device connected to an external storage device storing a multimedia file comprising a plurality of frames, the electronic device comprising:
   a first decoder configured to decode the plurality of frames of the multimedia file and output a first decoded file;
   an encoder configured to encode decoded frames included in the first decoded file and output a video thumbnail file including the encoded frames;
   a memory configured to store data; and
   a controller configured to read the multimedia file from the external storage device, extract the plurality of frames from the read multimedia file, control the first decoder and the encoder to respectively output the first decoded file and the video thumbnail file, and control the memory to store the video thumbnail file,
   wherein the controller is configured to sample frames from the plurality of frames at preset time intervals and provide frame data including the frames sampled from the plurality of frames to the first decoder.

2. The electronic device of claim 1, wherein the multimedia file comprises a plurality of intra frames, and
   wherein the controller is configured to extract at least two intra frames from the plurality of intra frames and provide frame data including the extracted at least two intra frames to the first decoder.

3. The electronic device of claim 1,
   wherein the controller is configured to extract the plurality of frames from the multimedia file and provide frame group data including the plurality of frames to the first decoder, and
   wherein the first decoder is configured to decode the frames sampled from the plurality of frames at the preset time intervals or at least two intra frames.

4. The electronic device of claim 1, further comprising:
   a second decoder configured to decode a bit stream provided by the controller and output a second decoded file to the controller, wherein the controller is configured to process the second decoded file; and
   a display device configured to perform a display operation based on the second decoded file processed by the controller.

5. The electronic device of claim 4, wherein the video thumbnail file is stored in the memory during a period at least partially overlapping a period during which the display operation is performed.

6. The electronic device of claim 4, wherein the bit stream provided by the controller is generated by the controller based on the multimedia file stored in the external storage device.

7. The electronic device of claim 1, further comprising:
   a communication circuit configured to receive a bit stream from outside the electronic device and provide the bit stream to the controller;
   a second decoder configured to decode the bit stream provided by the controller and output a second decoded file to the controller, wherein the controller is configured to process the second decoded file; and
   a display device configured to perform a display operation based on the second decoded file processed by the controller.

8. The electronic device of claim 1, wherein a size of each of the encoded frames included in the video thumbnail file is less than a size of each of the plurality of frames included in the multimedia file.

9. The electronic device of claim 1, wherein the controller controls the external storage device to store the video thumbnail file in the external storage device.

10. The electronic device of claim 1, wherein a size of the video thumbnail file stored in the memory is less than a size of the multimedia file stored in the external storage device.

11. An electronic device connected to an external storage device storing a plurality of multimedia files, the electronic device comprising:
    a memory configured to store a plurality of video thumbnail files respectively corresponding to the plurality of multimedia files;
    a first decoder configured to decode all frames configuring a single video thumbnail file from among the plurality of video thumbnail files and output a first decoded file;
    a second decoder configured to decode sample frames sampled from the plurality of video thumbnail files and output a second decoded file;
    a user input module configured to output a selection signal;
    a controller configured to read the plurality of video thumbnail files from the memory, to control the first decoder to generate the first decoded file based on a selected video thumbnail file selected from the plurality of video thumbnail files based on the selection signal, control the second decoder to output the second decoded file, and process the first decoded file and the second decoded file; and
    a display device configured to display still thumbnail images and a video thumbnail image based on the first and second decoded files processed by the controller.

12. The electronic device of claim 11, wherein the controller is configured to extract frames from the plurality of video thumbnail files at preset time intervals as the sample frames, and provide frame data including the frames extracted at the preset time intervals to the second decoder.

13. The electronic device of claim 11, wherein the controller is configured to extract intra frames included in the plurality of video thumbnail files as the sample frames, and provide frame data including the intra frames to the second decoder.

14. The electronic device of claim 11, wherein the controller is configured to
    provide frame data including the sample frames respectively corresponding to the plurality of video thumbnail files to the second decoder,
    process the second decoded file output from the second decoder,
    when the selection signal is received after the second decoded file is processed, provide frames configuring the selected video thumbnail file to the first decoder, and
    process the first decoded file output from the first decoder.

15. The electronic device of claim 14, wherein the display device is configured to
- display the still thumbnail images based on the second decoded file processed by the controller, and
- after the selection signal is received, display a still thumbnail image from among the still thumbnail images corresponding to the selection signal as the video thumbnail image.

16. The electronic device of claim 11, wherein sizes of the plurality of video thumbnail files stored in the memory are less than sizes of the plurality of multimedia files stored in the external storage device.

17. A method of operating an electronic device connected to an external storage device storing a multimedia file comprising a plurality of frames, the electronic device comprising a controller, a decoder and an encoder, the method comprising:
- reading, by the controller, the multimedia file from the external storage device;
- decoding, by the decoder, sample frames among the plurality of frames of the read multimedia file;
- encoding, by the encoder, the decoded sample frames to provide reduced size decoded sample frames; and
- storing, by the controller, a video thumbnail file including the encoded sample frames in memory included in the electronic device, wherein the decoding of the sample frames among the plurality of frames of the read multimedia file comprises:
- sampling frames from the plurality of frames at preset time intervals; and
- decoding the frames sampled at the preset time intervals as the sample frames.

18. The method of claim 17, wherein the encoding of the decoded sample frames comprises:
- reducing sizes of the decoded sample frames to provide reduced-size decoded sample frames; and
- generating the video thumbnail file as including the reduced-size decoded sample frames.

* * * * *